United States Patent
Cha et al.

(10) Patent No.: US 11,156,974 B2
(45) Date of Patent: Oct. 26, 2021

(54) APPLIANCES AND CONTROL METHOD THEREOF

(71) Applicant: Samsung Electronics Co., Ltd., Suwon-si (KR)

(72) Inventors: Jae-hoon Cha, Suwon-si (KR); Seong-su Kim, Suwon-si (KR); Min-gyu Kim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/217,834

(22) Filed: Dec. 12, 2018

(65) Prior Publication Data
US 2019/0196426 A1      Jun. 27, 2019

(30) Foreign Application Priority Data
Dec. 22, 2017   (KR) .................. 10-2017-0178357

(51) Int. Cl.
*G05B 19/042*       (2006.01)
*F24F 11/00*        (2018.01)
(Continued)

(52) U.S. Cl.
CPC ........ *G05B 19/042* (2013.01); *F24F 11/0008* (2013.01); *F24F 11/54* (2018.01);
(Continued)

(58) Field of Classification Search
CPC .......... G05B 19/042; G05B 2219/2231; G05B 2219/23462; F24F 11/54; F24F 11/0008; F24F 3/1603
See application file for complete search history.

(56) References Cited

U.S. PATENT DOCUMENTS 6,001,145 A * 12/1999 Hammes .............. A61L 9/16
                                                 55/471
7,419,533 B2    9/2008 Son et al.
(Continued)

FOREIGN PATENT DOCUMENTS

| CN | 1477604 A   | 2/2004 |
| CN | 101847801 A | 9/2010 |

(Continued)

OTHER PUBLICATIONS

International Search Report and Written Opinion dated Mar. 14, 2019, issued in an International application No. PCT/KR2018/014916.
(Continued)

*Primary Examiner* — Thomas C Lee
*Assistant Examiner* — Gary Collins
(74) *Attorney, Agent, or Firm* — Jefferson IP Law, LLP

(57) ABSTRACT

An appliance is provided. The appliance includes a transceiver, and a processor configured to, based on an external appliance being identified to be adjacent to the appliance, receive arrangement state information of the external appliance through the transceiver, identify whether the appliance is a slave device controlled by the external appliance or a master device to control the external appliance based on the arrangement state information of the external appliance and arrangement state information of the appliance, based on the appliance being identified as the slave device, transmit a control authority to the external appliance through the transceiver, and based on the appliance being identified as the master device, request the control authority from the external appliance identified as the slave device through the transceiver.

19 Claims, 10 Drawing Sheets

(51) Int. Cl.
*F24F 11/54* (2018.01)
*F24F 3/16* (2021.01)

(52) U.S. Cl.
CPC .... *F24F 3/1603* (2013.01); *G05B 2219/2231* (2013.01); *G05B 2219/23462* (2013.01)

(56) References Cited

U.S. PATENT DOCUMENTS

| | | | |
|---|---|---|---|
| 9,091,451 B2 | 7/2015 | Hansen et al. | |
| 2005/0172816 A1 | 8/2005 | Son et al. | |
| 2006/0277875 A1* | 12/2006 | Schuld | B01D 46/0004 55/484 |
| 2009/0041632 A1* | 2/2009 | Day | A61L 9/205 422/121 |
| 2010/0307178 A1* | 12/2010 | Hansen | B64F 1/364 62/132 |
| 2012/0067965 A1 | 3/2012 | Rajasekaran et al. | |
| 2012/0154128 A1 | 6/2012 | Cho et al. | |
| 2013/0037027 A1* | 2/2013 | Schuller | A62B 18/08 128/204.21 |
| 2013/0057076 A1* | 3/2013 | Lavender | H02J 1/10 307/80 |
| 2014/0020561 A1* | 1/2014 | Aery | B01D 46/0021 96/224 |
| 2016/0061468 A1 | 3/2016 | Alexander et al. | |
| 2017/0138615 A1 | 5/2017 | Liang et al. | |

FOREIGN PATENT DOCUMENTS

| | | |
|---|---|---|
| CN | 102803856 A | 11/2012 |
| JP | H11-299597 A | 11/1999 |
| KR | 10-2006-0026319 A | 9/2004 |
| KR | 20-0378995 A | 3/2005 |
| KR | 10-0507996 B1 | 8/2005 |
| KR | 10-0552689 B1 | 2/2006 |
| KR | 10-2006-0117385 A | 11/2006 |
| KR | 10-2018-0019354 A | 3/2008 |
| KR | 10-1208212 B1 | 12/2012 |
| KR | 10-2017-0041663 A | 4/2017 |
| WO | 2010/141254 A1 | 12/2010 |
| WO | 2015/164599 A1 | 10/2015 |

OTHER PUBLICATIONS

Smart air cleaner "Brid" that does not require a filter exchange based on nano and photocatalyst technology, posted on Aug. 8, 2017, https://blog.naver.com/geekstarter/221069150990.

Extended European Search Report dated Jun. 8, 2020, issued in European Application No. 18892308.0.

Chinese Office Action dated May 28, 2021, issued in Chinese Application No. 201880075877.3.

* cited by examiner

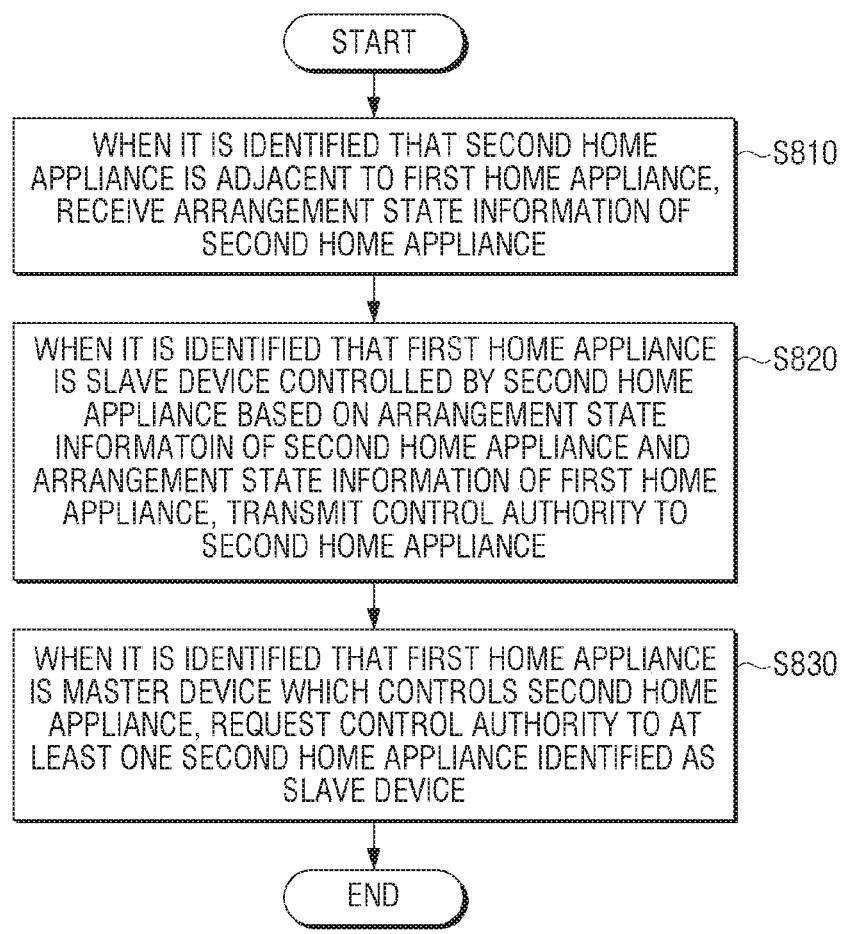

APPLIANCES AND CONTROL METHOD THEREOF

CROSS-REFERENCE TO RELATED APPLICATION(S)

This application is based on and claims priority under 35 U.S.C. § 119 of a Korean patent application number 10-2017-0178357, filed on Dec. 22, 2017, in the Korean Intellectual Property Office, the disclosure of which is incorporated herein by reference in its entirety.

BACKGROUND

1. Field

The disclosure pertains to an appliance and a controlling method thereof. More particularly, the disclosure relates to a modular appliance and a controlling method thereof.

2. Description of Related Art

Modular appliances are devices that can be attached or detached from other appliances. If the modular appliances are arranged in a stacked form, there is an advantage that a space can be utilized. For example, when two modular air cleaners are arranged in a stacked configuration rather than in a separated manner in a living room, the planar space occupied by the two air cleaners can be reduced.

However, various modular appliances function independently even if they are attached to each other between the modular appliances. That is, in order to control a plurality of attached modular appliances, there is an inconvenience that a user has to input a user command separately into each appliance.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an appliance for selecting at least one of a plurality of documents searched based on a keyword and providing summary information of the selected documents related to a keyword, and a controlling method thereof.

An object of the disclosure is to provide an appliance which is communicatively connected between stacked modular appliances and controlled in an integrated manner, and a controlling method thereof.

In accordance with an aspect of the disclosure, an appliance is provided. The appliance includes a transceiver, and at least one processor configured to, based on an external appliance being identified to be adjacent to the appliance, receive arrangement state information of the external appliance through the transceiver, identify whether the appliance is a slave device controlled by the external appliance or a master device to control the external appliance based on the arrangement state information of the external appliance and arrangement state information of the appliance, based on the appliance being identified as the slave device, transmit a control authority to the external appliance through the transceiver, and based on the appliance being identified as the master device, request the control authority from the external appliance identified as a slave device through the transceiver.

Additional aspects will be set forth in part in the description which follows and, in part, will be apparent from the description, or may be learned by practice of the presented embodiments.

The at least one processor may, based on the external appliance being identified to be disposed at a lower portion of the appliance, identify the external appliance as a slave device and request a control authority to the external appliance, and based on the external appliance being identified to be disposed at an upper portion of the appliance, identify the appliance as a slave device and control the transceiver to transmit the control authority to the external appliance.

The at least one processor may, based on the appliance being identified such that an external appliance is not disposed at an upper portion and an external appliance is disposed only at a lower portion of the appliance, identify the appliance as a master device, and receive, via the transceiver, a control authority to control an external appliance disposed at the lower portion and control the external appliance.

The at least one processor is further configured to identify that the external appliance is adjacent to the appliance, in case of at least one of an event in which a connection operation is detected in a connector to connect with an external appliance, an event in which a preset voltage value is detected in a port which is physically connected to an external appliance, and an event in which a preset signal is received through proximity communication with an external appliance.

The at least one processor is further configured to identify whether an external appliance is disposed on an upper portion of the appliance based on a voltage value measured from a first wired connection port disposed at an upper portion of the appliance, and identify whether an external appliance is disposed on a lower portion of the appliance based on a voltage value measured from a second wired connection port disposed at a lower portion of the appliance.

The at least one processor is further configured to, based on the external appliance being disposed at an upper portion of the appliance, control supply of power to the external appliance.

The at least one processor is further configured to control the transceiver to transmit a signal including type information of the appliance to the external appliance, and based on the transceiver receiving a response signal including information of a type which is same as the appliance from the external appliance, identify the external appliance as being adjacent to the appliance.

The appliance may be an air purifier.

The arrangement state information may include information on a top which indicates an uppermost arrangement, a bottom which indicates a lowermost arrangement, and a middle which indicates an arrangement between the uppermost and the lowermost position, from among a plurality of stacked external appliances.

The appliance and the external appliance may include modular devices that are physically connected to another appliance.

In accordance with another aspect of the disclosure, a method of controlling an appliance is provided. The method includes based on an external appliance being identified as being adjacent to the appliance, receiving arrangement state information of the external appliance, identifying whether the appliance is a slave device controlled by the external appliance or a master device to control the external appliance based on the arrangement state information of the external appliance and arrangement state information of the appliance, based on the appliance being identified as the slave device, transmitting a control authority to the external appliance, and based on the appliance being identified as the master device, requesting the control authority from the external appliance identified as the slave device.

The identifying of whether the appliance is the slave device may include, identifying the external appliance as a slave device based on the external appliance being identified to be disposed at a lower portion of the appliance, and identifying the appliance as a slave device based on the external appliance being identified to be disposed at an upper portion of the appliance.

The identifying of whether the appliance is the slave device may include, identifying the appliance as a master device based on the appliance being identified such that an external appliance is not disposed at an upper portion and an external appliance is disposed only at a lower portion of the appliance, and receiving a control authority to control an external appliance disposed at the lower portion to control the external appliance.

The identifying of the external appliance as being adjacent to the appliance may include identifying that the external appliance is adjacent to the appliance, in case of at least one of an event in which a connection operation is detected in a connector to connect with an external appliance, an event in which a preset voltage value is detected in a port which is physically connected to an external appliance, and an event in which a preset signal is received through proximity communication with an external appliance.

The identifying of the external appliance as being adjacent to the applicant may include identifying whether an external appliance is disposed on an upper portion of the appliance based on a voltage value measured from a first wired connection port disposed at an upper portion of the appliance, and identifying whether an external appliance is disposed on a lower portion of the appliance based on a voltage value measured from a second wired connection port disposed at a lower portion of the appliance.

The method may further include, supplying power to the external appliance based on the external appliance being disposed at an upper portion of the appliance.

The method may further include transmitting a signal including type information of the appliance to the external appliance, and based on receiving a response signal including information of a type which is same as the appliance from the external appliance, identifying the external appliance to be adjacent to the appliance.

The appliance may be an air purifier.

The arrangement state information may include information on a top which indicates an uppermost arrangement, a bottom which indicates a lowermost arrangement, and a middle which indicates an arrangement between the upper most and the lowermost position, from among a plurality of stacked external appliances.

The appliance and the external appliance may be modular devices that are physically connected to another appliance.

As described above, according to various embodiments of the disclosure, modular appliances can be stacked to provide improved performance, and a plurality of stacked appliances are integrally controlled, thereby improving user convenience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWING

The above and other aspects, features, and advantages of certain embodiments of the disclosure will be more apparent from the following description taken in conjunction with the accompanying drawings, in which:

FIG. 8 is a flowchart to describe a method for controlling the appliance according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the expression 'at least one of a, b, and c' means that at least one of 'a', 'b', 'c', 'a and b', 'a and c', 'b and c', b, and c'.

Hereinbelow, the disclosure will be described in a greater detail using the drawings attached hereto.

Figure 1:
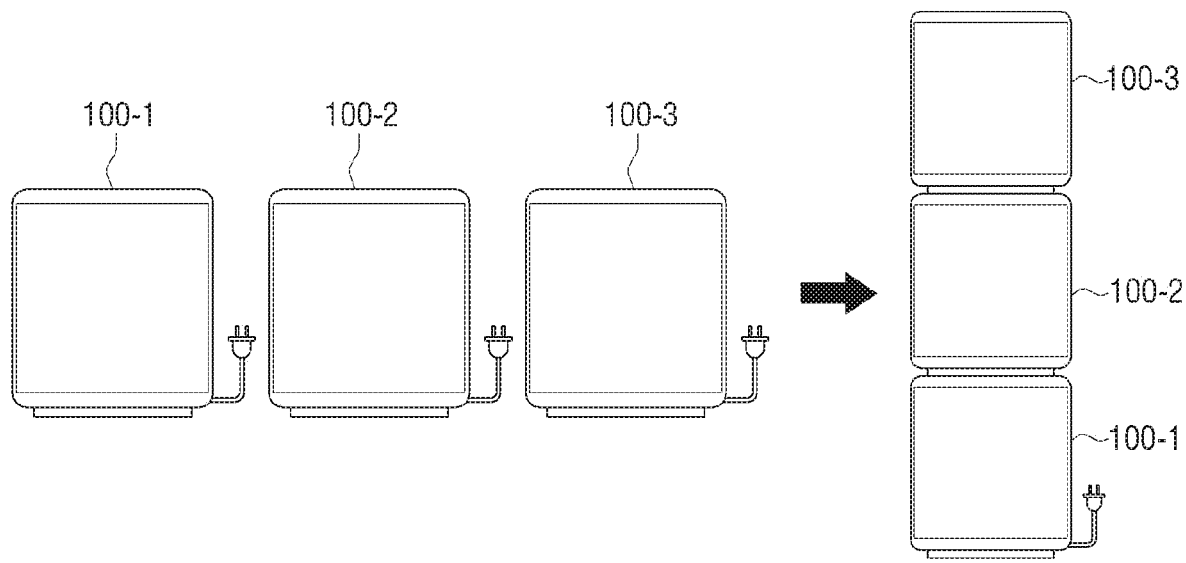
FIG. 1 is a mimetic diagram to describe an electronic system in which modular appliances are stacked and integrally controlled according to an embodiment of the disclosure.

FIG. 1 is a mimetic diagram to describe an electronic system in which modular appliances are stacked and integrally controlled according to an embodiment of the disclosure.

Referring to FIG. 1, an electronic system 10 includes a plurality of appliances 100-1, 100-2, and 100-3.

Each of the plurality of appliances 100-1, 100-2, and 100-3 may be a modular device that can be attached to or detached from other appliances. Each of the appliances 100-1, 100-2, and 100-3 can receive power from an adapter provided in each of the appliances and can independently perform the function of the appliances. When the plurality of appliances 100-1, 100-2, and 100-3 are stacked, power may be supplied to the other appliances stacked through the adapter provided in the appliances at the lowermost end to perform the function of the appliance integrally as one appliance. That is, when a plurality of appliances is stacked and integrally controlled, when a user command is input, a plurality of appliances stacked can perform an operation corresponding to a user command.

For example, when the second appliance 100-2 is disposed on the first appliance 100-1 powered by the adapter and connected to the first appliance 100-1, the first and second appliances 100-1 and 100-2 can be integrally controlled while receiving power from the appliance 100-1. Thereafter, when the third appliance 100-3 is disposed above the second appliance 100-2, the power supplied from the first appliance 100-1 is supplied to the third appliance 100-3 through the second appliance 100-2, and the first to third appliances 100-1, 100-2, and 100-3 can be integrally controlled.

The appliance 100 may be a modular appliance that can be detached from or attached to other appliances, and may be implemented as an air cleaner, but it is not limited thereto and may be implemented as an appliance of various types such as a humidifier and a speaker.

When a plurality of appliances is stacked and integrally controlled, the performance of the appliances can be improved by the number of stacked appliances. For example, if the appliance 100 is implemented as an air purifier and three air purifiers are stacked, the three air purifiers are integrally controlled as one device by a user command, such as one device, and air cleaning function which is three times better than that of a single air purifier can be performed.

According to an embodiment of the disclosure, when a plurality of appliances is stacked, each appliance identifies the adjacent appliance(s) to determine the relative positions of each appliance, and selects the master devices so that a plurality of appliances is integrally controlled. Various embodiments of the disclosure will be described in detail with reference to the drawings.

Figure 2A:
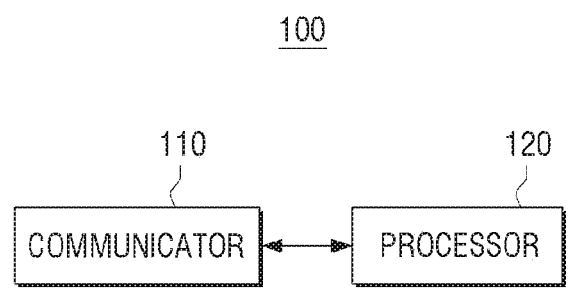
FIG. 2A and FIG. 2B are block diagrams illustrating the configuration of the appliance according to an embodiment of the disclosure.
Figure 2B:
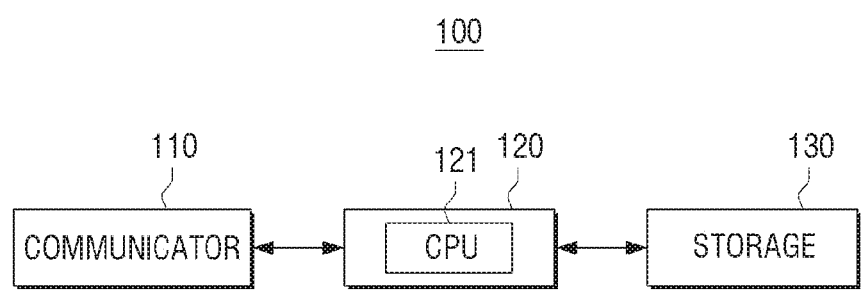

FIG. 2A and FIG. 2B are block diagrams illustrating the configuration of the appliance according to an embodiment of the disclosure.

Referring to FIG. 2A, the appliance 100 includes a communicator 110 (e.g., a transceiver or communication circuit) and a processor 120 (e.g., at least one processor).

The communicator 110 performs communication with the external appliance which is adjacent to the appliance 100.

Here, the communicator 110 may perform wireless communication with an external appliance through a communication method such as Bluetooth (BT), Wi-Fi, Zigbee, infrared (IR) and the like. Also, the communicator 110 may perform wired communication with an external appliance through various communication methods such as serial interface, universal serial bus (USB), near field communication (NFC). Alternatively, the communicator 110 may perform wired communication with an external appliance using communication methods such as universal asynchronous receiver/transmitter (UART), serial peripheral interface (SPI), and inter integrated circuit (I2C).

For example, when the predetermined event occurs, the communicator 110 can perform the communication according to the predetermined communication method with the external appliance to be in the interlocked state. Here, the interlocked state may mean all states in which the communication is possible such as an operation of initializing communication between the appliance 100 and an external appliance, an operation of forming a network, an operation of performing pairing of the appliance, and the like. For example, the device identification information of the external appliance may be provided to the appliance 100, so that a pairing procedure between the two appliances can be performed accordingly. For example, when a preset event occurs in the appliance 100 or an external appliance, the peripheral device may be searched for through a digital living network alliance (DLNA) technology, and pairing can be performed with the searched device to be in the interlocked state.

The processor 120 controls overall operations of the appliance 100.

According to one embodiment, the processor 130 may be implemented as a digital signal processor (DSP), a microprocessor, or a time controller (TCON) for processing digital signals, but is not limited thereto, and can include at least one of a central processing unit (CPU), a microcontroller unit (MCU), a micro processing unit (MPU), a controller, an application processor (AP), a communication processor, or an ARM processor, or defined with the term. The processor 120 may be implemented as a system on chip (SoC) or a large-scale integration (LSI) with a built-in processing algorithm. Alternatively, the processor 120 may be implemented as a field programmable gate array (FPGA).

The processor 120 can receive the arrangement state information of the external appliances through the communicator 110 when the external appliances are identified as being adjacent to the appliances 100. For example, when a Bluetooth communication method is used between the appliance 100 and an external appliance, the processor 120 may receive identification information of the external appliance from the peripheral external appliance to perform a pairing connection between specific external appliances. The identification information may include the product name, the product number, the MAC address of the external appliance, and the type information indicating the type of the external appliance, in particular, the arrangement state information of the external appliance.

In case of at least one of an event in which a connection operation is detected in a connector to connect with an external appliance, an event in which a preset voltage value is detected in a port which is physically connected to an external appliance, and an event in which a preset signal is received through proximity communication with an external appliance, the processor 120 may identify that an external appliance is adjacent to the appliance 100.

The event that a connection operation is detected in a connector for physically connecting to an external appliance may be, for example, when specific buttons are provided at the top and bottom of the appliance 100, and a protrusion is provided and stacked at the upper portion and lower portion of the external appliance, in order to safely fix the external appliance to the appliance 100 when the external appliance is stacked on the upper portion of the appliance 100, may be an event that the aforementioned specific button is necessarily pressed by the protrusion provided at the lower portion of the external appliance. The processor 120 can identify that the button provided on the upper portion of the appliance 100 is pressed and that the external appliance is located adjacent to the appliance 100. Alternatively, the processor 120 may identify that, if the button provided at the lower portion of the appliance 100 is pressed, the appliance 100 is located adjacent to the external appliance at the lower portion.

An event in which a predetermined voltage value is sensed at a port physically connected to the external appliance is an event which may identify that the external appliance is positioned adjacent to the upper portion or lower portion based on the voltage value measured in the upper portion and the lower portion. Here, the port which is physically connected to the external appliance may be a port which is physically connected to provide or receive a voltage value.

The processor 120 may identify whether an external appliance is disposed at an upper portion of the appliance 100 based on the voltage value measured at the first wired connection port located at an upper portion of the appliance. In the case where no external appliance is disposed on the upper portion of the appliance 100, the voltage value may maintain a constant value. When the external appliance is disposed on the upper portion of the appliance 100, the voltage value measured at the first wired connection port may be changed as the external appliance is connected to the external appliance to supply the voltage to the external appliance disposed at an upper portion. According to one embodiment of the disclosure, when the voltage value measured at the first wired connection port is reduced and reaches the first threshold, the processor 120 may identify that the external electrical appliance is disposed adjacent to the top of the electrical appliance 100. In addition, when the external appliance is disposed at a lower portion of the appliance 100, the voltage value measured at the second wire connection port changes as the voltage is supplied from the external appliance disposed at a lower portion. According to one embodiment of the disclosure, when the voltage value measured at the second wired connection port is increased and reaches the second threshold, the processor 120 may identify that the external appliance is disposed adjacent to a lower portion of the appliance 100.

The event in which the predetermined signal is received through the proximity communication with the external appliance may be an event in which the signal including the identification information of the external appliance is received in the proximity communication module. The identification information may include the product name, the product number, the MAC address of the external appliance, and the type information indicating the type of the external appliance.

According to one embodiment of the disclosure, the processor 120 may transmit signals including type information of the appliance 100 to external appliances. The processor 120 may transmit identification information including type information of the appliance 100 to an external appliance through a proximity communication module provided at the upper portion and the lower portion of the appliance 100. For example, the proximity communication module provided on the upper and lower portions may be an NFC module, but is not limited thereto, and may be a radio-frequency identification (RFID) module or a module for transmitting and receiving an IR signal.

The processor 120 can identify the external appliance as a state adjacent to the appliance 100 when a response signal including the same type information as the appliance 100 is received from the external appliance. The processor 120 can receive identification information including the type information of the external appliance from the external appliance through the proximity communication module provided at the upper portion and the lower portion of the appliance 100.

If the type information included in the identification information is identified to be the same as the type information of the appliance 100, the processor 120 can identify that the external appliance is disposed adjacent to the upper portion or lower portion of the appliance 100. For example, if the type information included in the identification information received from the external appliance through the upper NFC module is identified to be the same as the appliance 100, the processor 120 may identify that the external appliance is disposed adjacent to the upper portion of the appliance 100. If the type information included in the identification information received from the external appliance through the lower NFC module is identified to be the same as the appliance 100, the processor 120 may identify that the external appliance is disposed to be adjacent to the lower portion of the appliance 100. Here, the appliance 100 may be an air purifier. However, the disclosure is not limited thereto, and the appliance 100 may be implemented by a humidifier or the like.

In addition, the disclosure is not limited to the case where the type information of the external appliance is the same as the type information of the appliance 100, but even in a case where a device corresponding to the previously stored type information is identified, it may be identified that an external appliance is disposed to be adjacent to the device. For example, the appliance 100 may be implemented as an air cleaner, and the external appliance disposed at the upper portion of the air cleaner may be a humidifier.

According to another exemplary embodiment, the processor 120 may identify that the external appliance disposed at an upper portion or lower portion of the appliance 100 is disposed to be adjacent, through wired connection with the external appliance.

The processor 120 may determine whether the external appliance is adjacent to the appliance 100 based on the above-described embodiments. Specifically, the processor 120 may identify whether the external appliance is disposed at the upper portion or lower portion of the appliance 100 and identify a direction of adjacent arrangement. Accordingly, the processor 120 can identify arrangement state information indicating the relative position of the appliances 100 among a plurality of stacked appliances.

Here, the arrangement state information includes a top indicating the upper-most arrangement state among the plurality of stacked external appliances, a bottom indicating the lower-most arrangement state, and a middle indicating the arrangement between the upper-most and lower-most arrangement. For example, if it is identified that the external appliances are disposed adjacent to the upper portion and lower portion of the appliances 100, the processor 120 can identify the arrangement state information of the appliances 100 as middle. Alternatively, if it is identified that the external appliances are disposed adjacent to only the lower portion of the appliance 100, the processor 120 identifies the arrangement state information of the appliances 100 as a top, and if it is identified that the external appliances are disposed adjacent to each other, the processor 120 can identify the arrangement state information of the appliances 100 as a bottom.

The processor 120 may receive identification information which includes the arrangement state information of an external appliance from the external appliance which is identified to be adjacent.

According to one embodiment, the processor 120 may receive the arrangement state information of the external appliances from the external appliances when the external appliances are identified as being arranged on the upper portion of the appliances 100 based on the above-described embodiments and clearly specify the external appliances disposed on the upper portion of the appliance 100. For example, when external appliances are arranged at the upper portion and the lower portion of the appliance 100, the processor 120 may identify that the external appliance is arranged at the upper portion and the lower portion of the appliance 100 based on at least one of the aforementioned specific events. Thereafter, the processor 120 may distinguish an external appliance arranged at an upper portion of the appliance 100 and an external appliance arranged at a lower portion clearly based on the identification information received from the external appliances disposed at an upper portion and a lower portion. The processor 120 may distinguish an external appliance disposed at an upper portion and an external appliance disposed at a lower portion of the appliance 100 based on the arrangement state information and MAC address of the external appliance included in the identification information received from the external appliance. For example, it is assumed that three appliances are stacked. The processor 120 may identify that the external appliance of which arrangement state information is bottom is disposed at a lower portion of the appliance 100, and that the external appliance of which arrangement state information is top is disposed at an upper portion of the appliance 100.

The processor 120 may perform a communication connection with an external appliance based on arrangement state information of external appliances disposed adjacent to the appliance 100. For example, when the arrangement state information of the appliance 100 is top and the arrangement state information of the adjacent external appliances is middle, the processor 120 determines that the appliance 100 and the external appliances can be stacked and may perform a communication connection with an external appliance.

If the appliance 100 is identified as a slave device controlled by an external appliance based on the arrangement state information of the external appliances and the arrangement state information of the appliances 100, the processor may transmit a control authority to an external appliance through the communicator 110. Thereafter, the appliance 100 may ignore the command input from the user and perform the operation according to the control command received from the external appliance.

The processor 120, if it is identified that an external appliance is disposed at an upper portion of the appliance 100, may identify the appliance 100 as a slave appliance and transmit control authority to an external appliance. For example, when the arrangement state information of the household appliances 100 is middle and the location state information of the external appliances disposed adjacent to the household appliances 100 is the top, the processor 120 may identify that the appliance 100 as a slave device and transmit a control authority of the appliance 100 to an external appliance of which the position state information is top, through the communicator 110. By transmitting the control authority, the appliance 100 may perform an operation corresponding to the control signal transmitted from a master device without performing an operation independently.

Alternatively, if the external appliance is identified as being located at a lower portion of the appliance 100, the processor 120 can identify the external appliance as a slave device and request control authority to the external appliance. For example, when the arrangement state information of the appliance 100 is in the top and the location state information of the external appliances disposed adjacent to the appliance 100 is middle, the processor 120 may identify the external appliance as a slave device and request to the external appliance of which state information is middle a control authority for the external appliance through the communicator 110. By receiving the control authority from the external appliance, the external appliance can perform the operation corresponding to the control signal transmitted from the appliance 100 without performing the operation independently. Thereafter, when a command is inputted from the user, the control signal corresponding to the inputted command can be transmitted to the external appliance disposed at a lower portion of the appliance 100. That is, the master device can transmit a control signal corresponding to the user command to the slave device. However, the disclosure is not limited thereto, and the processor 120 may identify the appliance 100 as a slave appliance when the external appliance is identified as being disposed on the appliance 100, and transmit a control signal to the external appliance.

If the arrangement state information of the appliance 100 is middle and the location information of the external appliances disposed adjacent to the appliance 100 is bottom, the processor 120 may identify the external appliance as a slave device and request the control authority of the external appliance to the external appliance of which position state information is bottom, through the communicator 110. The appliance 100 can transmit the control authority received from the external appliance whose position state information is bottom, to the external appliance whose position state information is located at the top of the appliance 100. That is, the appliance 100 in which the position state information is the middle may transmit not only the control right of the appliance 100 but also the control right of the external appliance disposed at the lower portion to the external appliance disposed at an upper part of the appliance 100. The disclosure is not limited thereto, and the external appliance disposed at an upper portion of the appliance 100 may directly receive a control authority from the external appliance disposed at a lower portion of the appliance 100.

The processor 120, if it is identified that the external appliance is not disposed at an upper portion of the appliance 100 and the external appliance is disposed only at a lower portion, may identify the appliance 100 as a master device.

When the appliance 100 is identified as a master device, the processor 120 may request control authority from an external appliance disposed under the appliance 100. For example, it is assumed that three appliances are stacked. The processor 120 may identify the appliance 100 disposed at the uppermost position among the plurality of stacked appliances as a master device and transmit a control authority to the external appliance of which position state information is middle, which is disposed at a lower portion of the appliance 100.

When the appliance 100 is identified as a master device, the processor 120 can control the external appliances by receiving control authority to control the external appliances disposed below. For example, when three appliances are stacked, the master device can control three appliances including itself. When the power off command is input to the three devices stacked from the user, the processor 120 may receive the power off command and can turn off the three stacked power sources. The processor 120 may transmit a control command to an external appliance located at a lower portion of the appliance 100 and having a middle position state information. Also, the processor may transmit the control command to the external appliance whose position state information is bottom, but may transmit the control command to the external appliance whose position state information is bottom through the external appliance whose position state information is middle.

The processor 120 can supply power to an external appliance when the external appliance is disposed on the top of the appliance 100. For example, it is assumed that the appliance 100 is disposed at the lowermost one of a plurality of stacked appliances. The appliance 100 is supplied with power through an adapter provided in the appliance 100 and can supply power to an external appliance provided in the top of the appliance 100. According to one embodiment, the appliance 100 can supply power to an external appliance through a connector physically connected to the external appliance. When the arrangement state information of the appliance 100 is in the middle, the appliance 100 can receive power from the external appliances disposed under the appliances 100, and supply power to the external electric appliance. However, the disclosure is not limited thereto, and the external appliance may be supplied with power through an adapter provided in the external appliance, and may be supplied to the appliance 100 disposed at the lower portion of the external appliance.

According to an exemplary embodiment, the appliance 100 and the external appliance may be a modular device which can be physically connected to another appliance. That is, the appliance 100 and the external appliance may be a device which can be attached to or detached from another appliance.

FIG. 2B is a view to describe an example of the detailed configuration of the appliance of FIG. 2A.

Referring to FIG. 2B, the appliance 100 includes the communicator 110, the processor 120, and the storage 130 (e.g., memory). From among the configurations in FIG. 2B, the configurations overlapped with the configurations of FIG. 2A will not be further described.

The processor 120 may include a central processing unit (CPU) 121, ROM (or non-transitory memory) in which a control program to control the appliance 100 is stored, and RANI (or transitory memory) which stores data input from the outside of the appliance 100 or is used as a storage area corresponding to various manipulations performed in the appliance 100.

When a preset event occurs, the processor 120 may execute an operating system (OS), programs, and various applications stored in the storage 130. The processor 120 may include a single core, a dual core, a triple core, a quad core, and a core of multiple times.

The CPU 121 accesses the storage 130 and performs booting using O/S stored in the storage 130 and performs various operations using various programs, contents, and data stored in the storage 130.

The processor 120, when an event to communicate with at least one external appliance occurs, may receive a signal including the arrangement state information of the external appliance from at least one external appliance through the communicator 110 during a preset time.

For example, when the Bluetooth communication method is used between the appliance 100 and an external appliance, the processor 120 may connect the external appliance to a specific external appliance through a Bluetooth pairing connection and identification information can be received. The identification information may include a product name, a product number, a MAC address of the external appliance, and type information indicating the type of the external appliance. Particularly, the arrangement information of the external appliance may be included.

The storage 130 may store various data, programs, or applications for driving/controlling the appliance 100. The storage 130 may store a control program for controlling the household appliances 100 and the processor 120, an application program initially provided or downloaded from a manufacturer, database, or related data. For example, the storage 130 may provide a UI for multi-channel configuration according to various embodiments of the disclosure, and may store a program for performing operations related to the UI.

In particular, the storage 130 may store identification information including intensity of a signal received from an external appliance, arrangement state information of external appliances, and type information. Here, the arrangement state information includes a top indicating the topmost arrangement among the plurality of stacked appliances, a bottom indicating the bottom arrangement, and a middle indicating the arrangement between the top and bottom ends. For example, the arrangement state information of the appliances arranged at the uppermost stage in which the three appliances are stacked is the top.

The storage 130 may be implemented as an internal memory such as a ROM or a RAM included in the processor 120 or may be implemented as a separate memory from the processor 120. In this case, the storage 130 may be implemented as a memory embedded in the appliance 100 or a memory removably attached to the appliance 100, depending on the purpose of data storage. For example, data for driving the appliance 100 may be stored in a memory embedded in the appliance 100. In the case of data for an extension function of the appliance 100, the data can be stored in a detachable memory. Meanwhile, the memory embedded in the appliance 100 may be implemented in the form of a non-volatile memory, a volatile memory, a hard disk drive (HDD), or a solid-state drive (SSD).

Figure 3A:
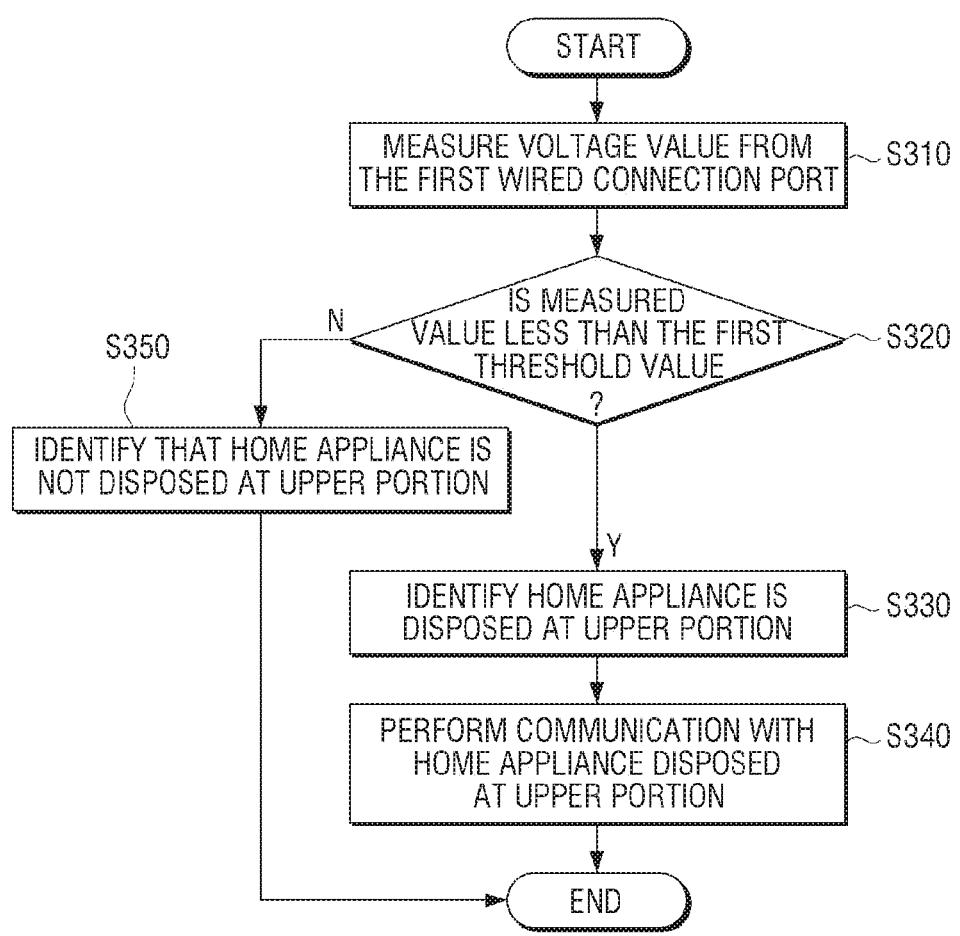
FIGS. 3A and 3B are views to describe an event to detect a preset voltage value from a port physically connected to another appliance according to an embodiment of the disclosure.
Figure 3B:
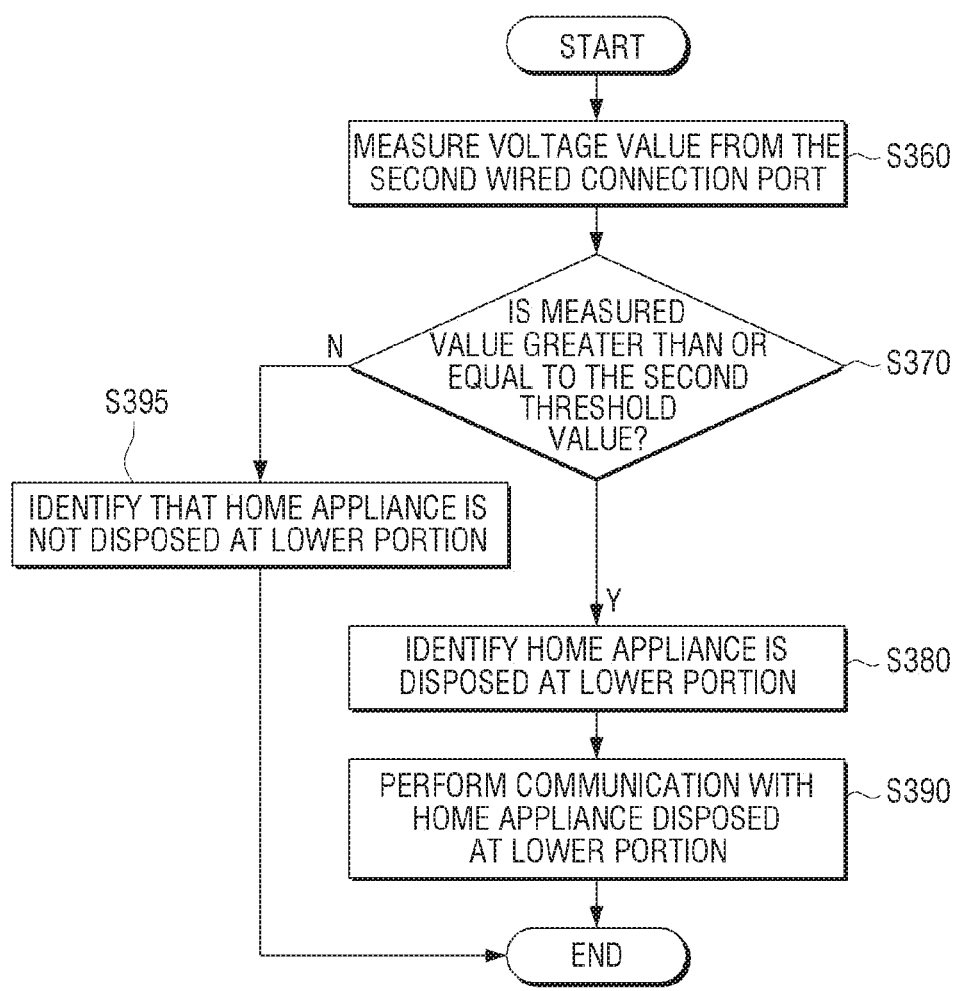

FIG. 3A and FIG. 3B are views to describe an event to detect a preset voltage value from a port physically connected to another appliance according to an embodiment of the disclosure.

The first appliance, when a preset voltage value is detected from a port that is physically connected to the second appliance, may identify that the second appliance is adjacent to the first appliance.

Based on the voltage value measured at an upper portion and a lower portion of the first appliance, the first appliance may identify that the second appliance is disposed adjacent to the upper portion or lower portion. Here, the port physically connected to the second appliance may be physically connected to supply or receive a voltage value.

Referring to FIG. 3A, the first appliance may identify whether the second appliance is disposed at an upper portion of the first appliance based on a voltage value measured by the first wired connection port that is disposed at the upper portion of the first appliance.

The first appliance can measure the voltage value at the first wired connection port in operation S310. If the second appliance is not disposed at the upper portion of the first appliance, the voltage value can be kept constant. When the second appliance is disposed at the upper portion of the first appliance, the voltage value measured at the first appliance may be changed as the second appliance is connected to the second appliance to provide a voltage to the second appliance.

The first appliance may identify whether the voltage value measured from the first wired connection port is reduced to reach the first threshold value in operation S320. When the voltage value measured from the first wired connection port is reduced to be less than the first threshold value in operation S320-Y, the first appliance may identify that the second appliance is disposed adjacent to the upper portion of the first appliance in operation S330.

The first appliance can perform a communication connection with the second appliance disposed in the upper portion of the first appliance in operation S340. The first appliance may receive the identification information including the arrangement state information of the second appliance which is identified to be adjacent and can clearly specify the second appliance disposed at the upper portion of the first appliance. The first appliance, based on the arrangement state information of the second appliance disposed adjacent to the first appliance, may perform communication connection with the second appliance. For example, when the arrangement state information of the first appliance is middle, and the arrangement state information of the second appliance is top, the first appliance may identify that the first appliance can be stacked with the second appliance and perform communication connection with the second appliance.

When the voltage value measured at the first wired connection port is not less than the first threshold value in S320-N, the first appliance may identify that the appliance is not disposed at the upper portion of the first appliance in operation S330.

Referring to FIG. 3B, the first appliance, based on the voltage value measured from the second wired connection port located at a lower portion of the first appliance, may identify whether the third appliance is disposed at a lower portion of the first appliance.

The first appliance can measure the voltage value at the second wired connection port in operation S350. If the third appliance is not disposed at the lower portion of the first appliance, the voltage value can be kept constant. When the third appliance is disposed at the lower portion of the first appliance, the voltage value measured at the second appliance is changed as the third appliance is connected to the third appliance to provide the voltage to the third appliance.

The first appliance may identify whether the voltage value measured at the second wired connection port is increased to reach a second threshold value in operation S360. When the voltage value measured at the second wired connection port is increased to be equal to or greater than the second threshold value in operation S360-Y, it can be identified that the third appliance is disposed adjacent to the lower portion of the first appliance in operation S370, and when the voltage value measured at the second wired connection port is not equal to or greater than the second threshold value in step operation S360-N, it can be identified that the third appliance is not disposed adjacent to the lower portion of the first appliance in operation S395.

The first appliance can perform a communication connection with the third appliance disposed in the upper portion of the first appliance in operation S380. The first appliance may receive the identification information including the arrangement state information of the third appliance which is identified to be adjacent and can clearly specify the third appliance disposed at lower portion of the first appliance. The first appliance, based on the arrangement state information of the third appliance disposed adjacent to the first appliance, may perform communication connection with the third appliance. For example, when the arrangement state information of the first appliance is middle, and the arrangement state information of the third appliance is bottom, the first appliance may identify that the first appliance can be stacked with the third appliance and perform communication connection with the third appliance.

When the voltage value measured at the second wired connection port is not greater than or equal to the second threshold value in S360-N, the first appliance may identify that the appliance is not disposed at the lower portion of the first appliance in operation S390.

Figure 4:
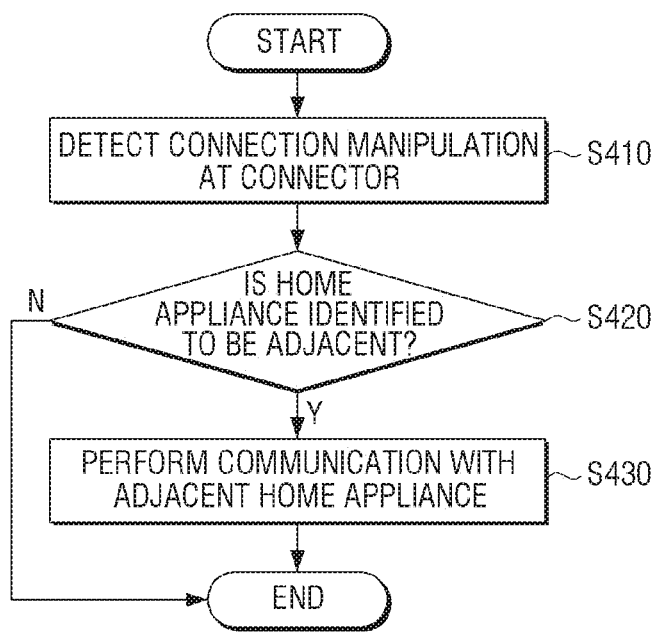
FIG. 4 is a view to describe an event to detect a connection manipulation from a connector to physically connect with the appliance according to an embodiment of the disclosure.

FIG. 4 is a view to describe an event to detect a connection manipulation from a connector to physically connect with the appliance according to an embodiment of the disclosure.

The first appliance, when connection manipulation is detected at a connector to physically connect with the second appliance, may identify that the second appliance is adjacent to the first appliance.

Here, the connector for physically connecting is used for securely fixing both of the appliances. For example, the connector may be constituted by a protrusion provided on the upper and lower portions of the appliance 100 and a button portion pressed by insertion of the protrusion. The button portion may also be provided at the upper and lower portions of the appliance 100, The first appliance can detect a connection operation at a connector of the first appliance in operation S410. When a second appliance is stacked on top of the first appliance, the button located on the top of the first appliance can be pressed by the protrusion located below the second appliance. In order to safely dispose the second appliance in the first appliance, the protrusion located below the second appliance must be inserted into the button located on the top of the first appliance. Therefore, the button located on the upper portion of the first appliance can inevitably be pressed.

The first appliance, when the button positioned at the upper portion or lower portion of the first appliance is pressed, may identify that the appliance is adjacently disposed at the upper portion or lower portion of the first appliance in operation S420.

When a button located on the upper portion of the first appliance is pressed, the first appliance can be identified as being located adjacent to the upper portion of the first appliance. Alternatively, if the button located at the lower portion of the first appliance is pressed, the first appliance can be identified as the appliance located adjacent to the lower portion of the first appliance.

The first appliance may perform communication connection with the appliance disposed adjacent to the first appliance in operation S430.

When the button positioned at the upper portion of the first appliance is pressed, the first appliance may receive the identification information including the arrangement state information of the third appliance which is identified to be adjacent and can clearly specify the second appliance disposed at upper portion of the first appliance. The first appliance, based on the arrangement state information of the second appliance, may perform communication connection with the third appliance. For example, when the arrangement state information of the first appliance is middle, and the arrangement state information of the second appliance is top, the first appliance may identify that the first appliance can be stacked with the second appliance and perform communication connection with the second appliance.

When the button positioned at the lower portion of the first appliance is pressed, the first appliance may receive the identification information including the arrangement state information of the appliance which is identified to be adjacent and can clearly specify the third appliance disposed at lower portion of the first appliance. The first appliance, based on the arrangement state information of the third appliance, may perform communication connection with the third appliance. For example, when the arrangement state information of the first appliance is middle, and the arrangement state information of the third appliance is bottom, the first appliance may identify that the first appliance can be stacked with the third appliance and perform communication connection with the third appliance.

When all the buttons located on the upper and lower portions of the first appliance are pressed, the first appliance may receive the identification information including the arrangement state information from the plurality of appliances arranged adjacent to the first appliance and distinguish between the second appliance and the third appliance arranged on the upper and lower portions of the first appliance based on the arrangement state information. The first appliance can perform a communication connection with the second appliance and the third appliance.

According to another embodiment, the button may be located only on the upper portion of the first appliance. In this case, when another device is disposed on the first appliance and the button is pressed, the first appliance can identify the first appliance as a slave device. Further, when the button located on the upper portion of the first appliance is not pressed, the first appliance can identify the first appliance as the master device.

Figure 5:
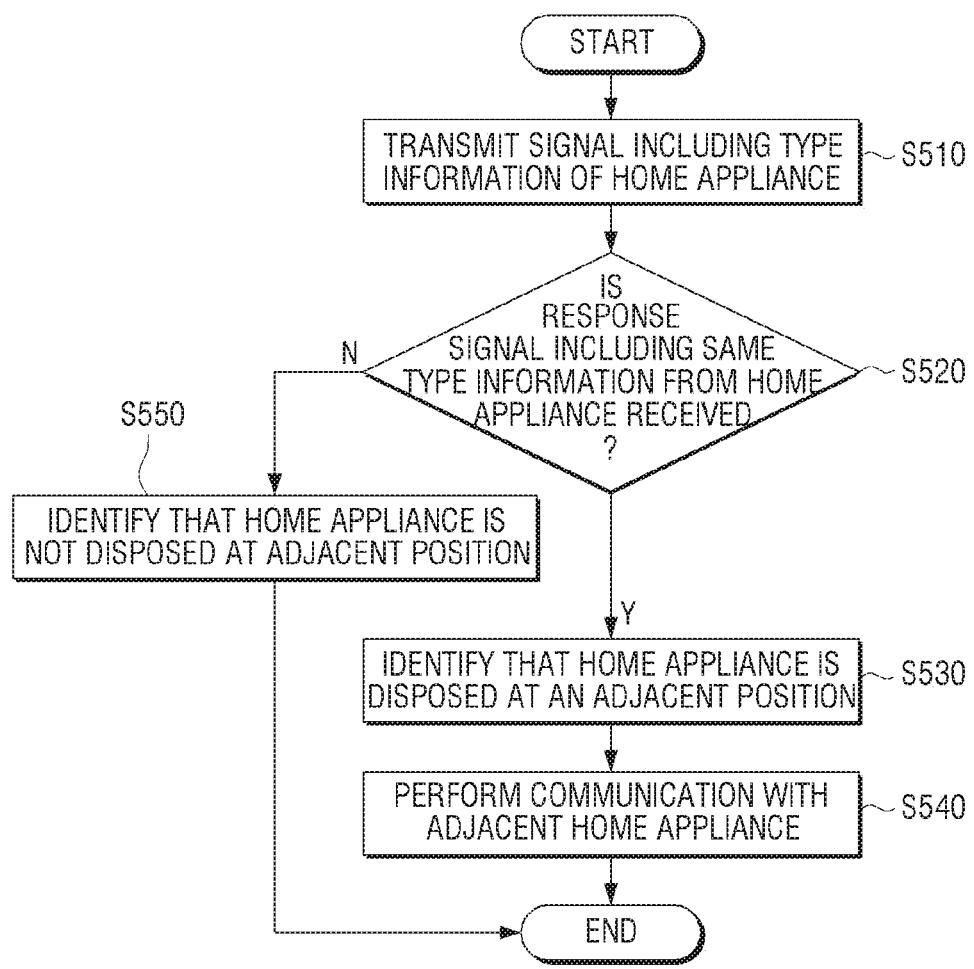
FIG. 5 is a view to describe an event to receive a preset signal through proximity communication with the appliance according to an embodiment of the disclosure.

FIG. 5 is a view to describe an event to receive a preset signal through proximity communication with the appliance according to an embodiment of the disclosure.

The first appliance, if a preset signal is received through proximity communication from the second appliance, may identify that the second appliance is adjacent to the first appliance.

The event in which the predetermined signal is received through the proximity communication may be an event in which the signal including the identification information of the appliance in the proximity communication module is received. The identification information may include a product name, a product number, a MAC address of the household appliance, and type information indicating the type of the appliance.

The first appliance can transmit a signal including the type information of the first appliance to another appliance in operation S510. The first appliance can transmit the identification information including the type information of the first appliance to another appliance through the proximity communication module provided at the top and bottom of the first appliance. For example, the proximity communication module provided on the upper and lower portions may be an NFC module, but is not limited thereto, and may be an RFID module or a module for transmitting and receiving an IR signal.

When the first appliance receives a response signal from another appliance, the first appliance may recognize that the appliance is adjacent in operation S520. Specifically, when a response signal is received from the other appliance, the first appliance can identify whether or not the received signal includes information including the same type information as the first appliance. If it is identified that the received signal includes information including the same type information as that of the first appliance in operation S520-Y, the first appliance may identify that the other appliance is disposed at a position adjacent to the first appliance in operation S530, and if it is identified that the received signal does not include information including the same type information as that of the first appliance in step operation S520-N, the first appliance may identify that the other appliance is not disposed at a position adjacent to the first appliance in operation S550.

According to a various embodiment, the first appliance may identify a direction that the other appliance is adjacent to the first appliance through the proximity communication module or wired communication module and so on.

For example, if the type information included in the identification information received from the other appliances through the NFC module located on the first appliances is identified as the same as the first appliance, it can be identified that the other appliance is arranged adjacent to the top of the first appliance. If the type information included in the identification information received from the other appliance through the NFC module located at the lower portion of the first appliance is identified as the same as the first appliance, it may be identified that the other appliance is disposed to be adjacent to a lower portion of the first appliance.

The first appliance may perform communication connection with the other appliance which is identified to be adjacent to the first appliance in operation S540.

Figure 6:
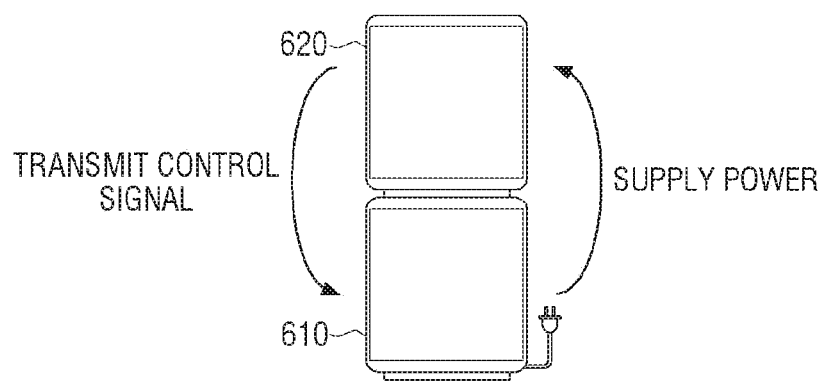
FIG. 6 is a view to describe a control signal transmission and power supply among appliances according to an embodiment of the disclosure.

FIG. 6 is a view to describe a control signal transmission and power supply among appliances according to an embodiment of the disclosure.

Referring to FIG. 6, a second appliance 620 is disposed at an upper portion of a first appliance 610. The first appliance 610 can be identified as a slave device and the second appliance 620 can be identified as a master device. Since the first and second appliances 610 and 620 are identified as the slave device and the master device, the detailed description thereof will be omitted.

The first appliance 610 may receive power from an adapter provided in the first appliance 610 and supply power to the second appliance 620 disposed at an upper portion of the first appliance 610. According to one embodiment, the first appliance 610 can supply power to the second appliance 620 through a connector physically connected to the second appliance 620. The disclosure is not limited thereto, and the second appliance 620 may receive power through the adapter of the second appliance 620 and supply power to the first appliance 610 disposed at a lower portion of the second appliance 620.

Meanwhile, when the second appliance 620 is identified as the master device, the second appliance 620 may request the control authority to the first appliance 610 identified as the slave device and receive the control authority of the first appliance 610. Then, the second appliance 620 can transmit a control signal corresponding to the user command to the second appliance 610.

For example, when a user command is input to the first appliance 610 and the second appliance 620, the first appliance 610 transmitting the control right to the second appliance 620 may ignore a user command, and the second appliance 620 can receive the user command and transmit the control signal corresponding to the user command to the first appliance 610. Accordingly, the first appliance 610 and the second appliance 620 can perform an operation corresponding to a user command. The disclosure is not limited thereto, and when the first appliance 610 is identified as the master device, the first appliance 610 may receive the control authority from the second appliance 620 and transmit a control signal corresponding to the user command to the second appliance 620.

Figure 7:
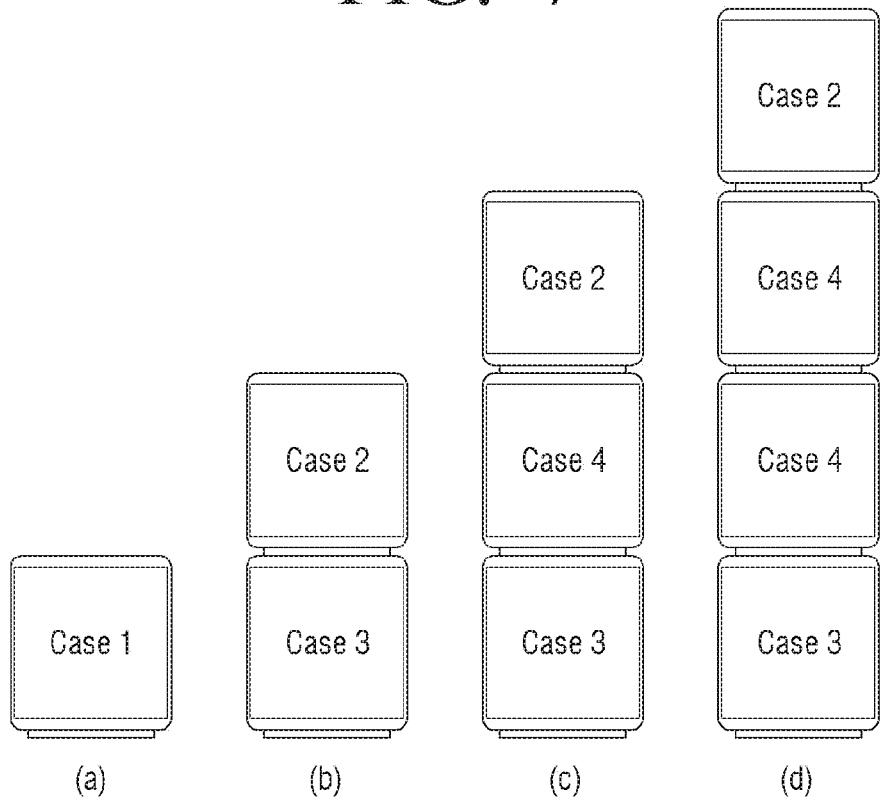
FIG. 7 describes arrangement state information of the appliance and a process for identifying a role according to an embodiment of the disclosure.

FIG. 7 is a view to describe arrangement state information of the appliance and a process for identifying a role according to an embodiment of the disclosure.

Part (a) of FIG. 7 indicates that another appliance is not disposed in an adjacent space and the appliance independently performs a function.

Parts (b), (c) and (d) of FIG. 7 illustrate that a plurality of appliances may be stacked. The plurality of stacked appliances shown in parts (b), (c) and (d) of FIG. 7 can be integrally controlled.

Each appliance can identify its arrangement state information and its role. In any of an event in which a connection manipulation is detected from a connector for physically connecting with the other device, an event in which a preset voltage value is detected from a port physically connected with the other appliance, and an event to receive a preset signal through proximity communication with the other appliance, it may be identified that the other appliance is adjacent to the appliance. Details of this operation have been described above, so a detailed description thereof will be omitted.

Referring to part (e) of FIG. 7, which illustrate Cases 1-4, the appliance of Case 1 can recognize that no other appliances adjacent to the upper and lower portions of the appliances are disposed, and can perform the function of appliances with independent appliances. The appliance of Case 2 identifies that the appliances adjacent to the bottom are not located but the appliances adjacent to only the bottom are arranged, so that the arrangement state information of the appliances of Case 2 is the top, and the role of the appliances of Case 2 is identified as the master device. Accordingly, the appliance of Case 2 receives the command input from the user, and may transmit the signal corresponding to the command to the slave device disposed at the lower portion. The appliance of Case 3 may identify that the appliances adjacent to the lower portion are not arranged but the appliances adjacent to only the upper portion are arranged. The positional information of the appliances of Case 3 is bottom, and the role of appliances of Case 3 is identified as slave devices. Accordingly, an operation corresponding to a signal transmitted from the master device can be performed. The appliance of Case 4 may identify that the appliances adjacent to the upper and lower portions are disposed, so that the location state information of the appliances of Case 4 is middle, and the role of appliances of Case 4 can be identified as slave device. Accordingly, an operation corresponding to a signal transmitted from the master device can be performed.

FIG. 8 is a flowchart to describe a method for controlling the appliance according to an embodiment of the disclosure.

When it is identified that the second appliance is adjacent to the first appliance, the first appliance may receive arrangement state information of the second appliance in operation S810. In any of an event in which a connection manipulation is detected from a connector for physically connecting with the other device, an event in which a preset voltage value is detected from a port physically connected with the other appliance, and an event to receive a preset signal through proximity communication with the other appliance, it may be identified that the second appliance is adjacent to the first appliance.

When the first appliance transmits a signal including the type information of the first appliance to the second appliance and the response signal including the same type information as the first appliance is received from the second appliance, it may be identified that the second appliance is adjacent to the first appliance. Here, regarding the event that the preset voltage is detected at the port physically connected to the second appliance, the first appliance may identify whether the second appliance is disposed at an upper portion of the first appliance based on the voltage value measured from the first wired connection port disposed at an upper portion of the first appliance, and identify whether the second appliance is disposed at a lower portion of the first appliance based on a voltage value measured by the second wired connection port disposed at a lower portion of the first appliance.

The first appliance, based on the arrangement state information of the second appliance and the arrangement state information of the first appliance, may identify whether the first appliance is a slave device controlled by the second external appliance or a master device which controls the second device in operation S820. According to an exemplary embodiment, if the first appliance is identified as being disposed at a lower portion of the first appliance, the second appliance may be identified as a slave device, and if it is identified that the second appliance is disposed at an upper portion of the first appliance, the first appliance may be identified as a slave device. That is, if it is identified that another appliance is not disposed at an upper portion of the first appliance, and other appliance is disposed only at a lower portion of the first appliance, the first appliance may be identified as a master device.

If the first appliance is identified as a slave device, the control authority is transmitted to the second appliance, and if the first appliance is identified as the master device, the control authority request can be sent to the second appliance identified as the slave device in operation S830. The first appliance can receive the control authority to control the other appliance disposed at a lower portion from the other appliance and control the other appliance. Detailed operation of each operation has been described and further description will be omitted.

At least some configurations of the methods according to various exemplary embodiments may be configured as an application type installable in the conventional electronic device.

At least some configurations of the methods according to the aforementioned various exemplary embodiments can be implemented by upgrade of software or hardware of a conventional electronic device.

In addition, at least some configurations of the various exemplary embodiments can be performed through an embedded server provided in the electronic device or an external server of an electronic device.

Meanwhile, the various embodiments described above can be implemented in a recording medium that can be read by a computer or a similar device using software, hardware, or a combination thereof. In some cases, the embodiments described herein may be implemented by the processor itself. According to a software implementation, embodiments such as the procedures and functions described herein may be implemented in separate software modules. Each of the software modules may perform one or more of the functions and operations described herein.

Meanwhile, computer instructions for performing the processing operations according to various embodiments of the disclosure described above may be stored in a non-transitory computer-readable medium. Computer instructions stored in such non-volatile computer-readable media may cause a particular device to perform processing operations according to various embodiments described above when executed by a processor.

Non-volatile computer readable medium means a medium that stores data for a short period of time such as a register, a cache, a memory, etc., but semi-permanently stores data and can be read by a device. Specific examples of non-transitory computer readable media include compact disc (CD), digital versatile disc (DVD), hard disk, Blu-ray disk, USB, memory card, ROM, etc.

While the disclosure has been shown and described with reference to various embodiments thereof, it will be understood by those skilled in the art that various changes in form and details may be made therein without departing from the spirit and scope of the disclosure as defined by the appended claims.

What is claimed is:

1. An appliance which is connectable to at least one external appliance, comprising:
   a transceiver; and
   a processor configured to:
      based on the at least one external appliance being connected to the appliance, identify location of the appliance based on connecting direction of the at least one external appliance,
      control the appliance to perform as a master device based on identifying that the appliance is arranged at certain location from among connected entire appliances,
      control the appliance to perform as a slave device based on identifying that the appliance is arranged at different location excluding the certain location from among connected entire appliances, and
      based on receiving user input while the appliance is performing as the master device, control the transceiver to transmit a control signal to perform an operation corresponding to the user input to the at least one external appliances.

2. The appliance of claim 1,
   wherein
   the certain location is the highest location from among entire appliances stacked perpendicularly, and
   wherein the processor controls the appliance to perform as the slave device based on identifying that the at least one external appliance is connected to an upper portion of the appliances.

3. The appliance of claim 1,
   further comprising a plurality of connectors disposed at an upper portion and a lower portion of the appliance, respectively,
   wherein the processor is further configured to, based on one of the plurality of connectors being connected to the external appliance, identify a relation regarding the connected at least one external appliance and the appliance based on a location of connected connector.

4. The appliance of claim 1, wherein the processor is further configured to identify that at least one of the external appliance is adjacent to the appliance, in case of at least one of:
   an event in which a predetermined voltage value is detected in a port which is physically connected to the at least one external appliance, or
   an event in which a predetermined signal is received through proximity communication with the at least one external appliance.

5. The appliance of claim 1, wherein the processor is further configured to:
   identify whether the at least one external appliance is disposed on an upper portion of the appliance based on a voltage value measured from a first wired connection port disposed at an upper portion of the appliance, and
   identify whether the at least one external appliance is disposed on a lower portion of the appliance based on a voltage value measured from a second wired connection port disposed at a lower portion of the appliance.

6. The appliance of claim 1, wherein the processor is further configured to, based on the at least one external appliance being disposed at an upper portion of the appliance, control supply of power to the external appliance.

7. The appliance of claim 1, wherein the processor is further configured to:
   control the transceiver to transmit a signal including type information of the appliance to the at least one external appliance, and
   based on the transceiver receiving a response signal including information of a type which is same as the appliance from the at least one external appliance, identify the at least one external appliance as being adjacent to the appliance.

8. The appliance of claim 7, wherein the appliance comprises an air purifier.

9. The appliance of claim 1,
   wherein the processor is further configured to identify the location of the appliance from among the entire appliances as one of a top, a bottom and a middle based on the connecting direction:
   wherein the top indicates an uppermost arrangement,
   wherein the bottom indicates a lowermost arrangement, and
   wherein the middle indicates an arrangement between the upper most and the lowermost position, from among a plurality of stacked external appliances.

10. The appliance of claim 1, wherein the appliance and the at least one external appliance comprise modular devices that are physically connected to another appliance.

11. A method of controlling an appliance, the method comprising:
   based on at least one external appliance being connected to the appliance, identifying location of the appliance based on connecting direction of the at least one external appliance;
   controlling the appliance to perform as a master device based on identifying that the appliance is arranged at certain location from among connected entire appliances;
   controlling the appliance to perform as a slave device based on identifying that the appliance is arranged at different location excluding the certain location from among connected entire appliances; and
   based on receiving user input while the appliance is performing as the master device, controlling a transceiver to transmit a control signal to perform and operation corresponding to the user input to the at least one external appliances.

12. The method of claim 11, wherein the certain location is the highest location from among entire appliances stacked perpendicularly, and further comprising:

controlling the appliance to perform as the slave device based on identifying that the at least one external appliance is connected to an upper portion of the appliances.

13. The method of claim 11, further comprising:

identifying that at least one of the external appliance is adjacent to the appliance, in case of at least one of:
- an event in which a predetermined voltage value is detected in a port which is physically connected to the at least one external appliance, or
- an event in which a predetermined signal is received through proximity communication with the at least one external appliance.

14. The method of claim 11, further comprising:

identifying whether the at least one external appliance is disposed on an upper portion of the appliance based on a voltage value measured from a first wired connection port disposed at an upper portion of the appliance; and identifying whether the at least one external appliance is disposed on a lower portion of the appliance based on a voltage value measured from a second wired connection port disposed at a lower portion of the appliance.

15. The method of claim 11, further comprising:

supplying power to the external appliance based on the at least one external appliance being disposed at an upper portion of the appliance.

16. The method of claim 11, further comprising:

transmitting a signal including type information of the appliance to the at least one external appliance; and based on receiving a response signal including information of a type which is same as the appliance from the at least one external appliance, identifying the at least one external appliance to be adjacent to the appliance.

17. The method of claim 16, wherein the appliance comprises an air purifier.

18. The method of claim 11, further comprising:

identifying the location of the appliance from among the entire appliances as one of a top, a bottom and a middle based on the connecting direction wherein the top indicates an uppermost arrangement, wherein the bottom indicates a lowermost arrangement, and wherein the middle indicates an arrangement between the upper most and the lowermost position, from among a plurality of stacked external appliances.

19. The method of claim 11, further comprising:

determining that the appliance is neither the master device nor the slave device if no adjacent appliance is present.

* * * * *